United States Patent
Fan et al.

(10) Patent No.: US 9,754,733 B2
(45) Date of Patent: Sep. 5, 2017

(54) METHOD FOR PLASMA ACTIVATION OF BIOCHAR MATERIAL

(71) Applicant: South Dakota State University, Brookings, SD (US)

(72) Inventors: Qi Hua Fan, Ann Arbor, MI (US); Mukul Kumar Dubey, Pasadena, CA (US); Zhengrong Gu, Brookings, SD (US)

(73) Assignee: South Dakota State University, Brookings, SD (US)

( * ) Notice: Subject to any disclaimer, the term of this patent is extended or adjusted under 35 U.S.C. 154(b) by 83 days.

(21) Appl. No.: 14/701,125

(22) Filed: Apr. 30, 2015

(65) Prior Publication Data
US 2016/0322174 A1    Nov. 3, 2016

(51) Int. Cl.
| | | |
|---|---|---|
| C01B 31/08 | (2006.01) |
| H01G 11/34 | (2013.01) |
| B01J 19/08 | (2006.01) |
| H01G 11/86 | (2013.01) |
| H01G 11/38 | (2013.01) |

(52) U.S. Cl.
CPC .......... H01G 11/34 (2013.01); B01J 19/088 (2013.01); C01B 31/086 (2013.01); H01G 11/38 (2013.01); H01G 11/86 (2013.01)

(58) Field of Classification Search
CPC ........ H01G 11/34; H01G 11/38; H01G 11/86; C01B 31/086; B01J 19/088
See application file for complete search history.

(56) References Cited

U.S. PATENT DOCUMENTS

| | | |
|---|---|---|
| 5,034,265 A | 7/1991 | Hoffman et al. |
| 8,361,186 B1 | 1/2013 | Shearer et al. |
| 8,398,738 B2 | 3/2013 | Lee et al. |
| 8,709,122 B2 | 4/2014 | Lee et al. |
| 9,150,806 B1 | 10/2015 | Potgieter et al. |
| 2011/0172092 A1* | 7/2011 | Lee ................ C01B 31/081 502/416 |

FOREIGN PATENT DOCUMENTS

| | | |
|---|---|---|
| CN | 102050441 A | 5/2011 |
| CN | 104549155 A | 4/2015 |
| CN | 104587958 A | 5/2015 |
| WO | WO 2011/097183 A2 | 8/2011 |
| WO | WO 2011/097183 A3 | 8/2011 |
| WO | WO 2014/190235 A1 | 11/2014 |
| WO | WO 2015/027297 A1 | 3/2015 |

OTHER PUBLICATIONS

Gupta, Rakesh Kumar, et al. "Biochar activated by oxygen plasma for supercapacitors." Journal of Power Sources 274 (2015): 1300-1305.*
Chih, Y. K., et al. "Surface modification of hollow carbon fibres using plasma treatment." Surface Engineering 27.8 (2011): 623-626.*
Zhou, Jia-Yong, et al. "The surface structure and chemical characters of activated carbon fibers modified by plasma." Asia-Pacific Journal of Chemical Engineering 7.S2 (2012).*

* cited by examiner

Primary Examiner — Richard M Rump
(74) Attorney, Agent, or Firm — Patterson Thuente Pederson, P.A.

(57) ABSTRACT

A method for using plasma to activate biochar is disclosed where reactive gas(es) are excited by external power; biochar set on a sample holder is electrically biased or set at a floating potential so that charged particles of a certain type are attracted to the biochar, leading to intensive chemical reactions.

14 Claims, 20 Drawing Sheets

METHOD FOR PLASMA ACTIVATION OF BIOCHAR MATERIAL

FIELD OF THE INVENTION

The invention is directed to activation of biochar material, and more specifically to using plasma to efficiently modify the morphology and surface of biochar, which leads to enhanced performance in various applications of activated carbon materials, such as in energy storage in supercapacitors, water treatment, and air purification.

BACKGROUND OF THE INVENTION

Activated carbon is a material used extensively for water treatment, food processing, air purification, energy storage, and vehicle fuel recovery. In 2013, the United States used about 480 million pounds of activated carbon for these applications. Activated carbon is made from coal or biochar through activation, which is a critical step to creating porous nanostructures in carbon materials having a large surface area, proper distribution of pore size, and high surface energy.

Previous activation methods require high temperatures and are inefficient. For example, coal-based steam activation is conducted at high temperatures (>700° C.) and the yield is only about 45%.

In contrast to limited coal resources, biochar obtained from biomass pyrolysis is a "green" and sustainable material that is expected to eventually dominate the market of activated carbon. Unfortunately, conventional thermal activation of biochar also needs high temperatures (700-1200° C.) for hours using steam, $CO_2$, and/or a strong base (e.g. KOH) followed by chemical washing (to remove the residual base) and prolonged drying, respectively. This energy-intensive and lengthy treatment has become a critical barrier to meeting the globally increasing demands for activated carbon.

Furthermore, in the traditional thermochemical activation with convective and/or conductive heating, the biochar temperature is generally not uniform, depending on shapes and sizes of the material. This non-uniform heating causes local overheating and leads to low yield due to the complete combustion of part of the carbon.

Therefore, there is a strong need in industry for more efficient and effective methods of activating biochar.

SUMMARY OF THE INVENTION

Embodiments of the invention fulfill the need in the industry for more efficient and effective methods of activating biochar. The embodiments include a plasma treatment method that efficiently activates biochar, as evidenced by the superior performance of supercapacitors made of such activated biochar. The method includes:
- Introducing a reactive gas into a vacuum chamber to establish a certain pressure;
- Generating plasma in the chamber with an external power supply;
- Exposing biochar to the plasma for a period of time.

After treatment, the plasma activated biochar is ready for use in specific applications, such as the electrode materials in supercapacitors, water treatment, air purification, and other applications involving activated carbon or biochar.

In embodiments of the invention, the plasma is created through a dielectric barrier discharge. Electrodes connected to a power supply are separated from the biochar by a dielectric material such as quartz defining a vacuum chamber itself, or a window in the vacuum chamber through which RF energy can propagate.

In embodiments of the invention, the biochar is placed on a carrier that is electrically biased or at floating potential. The biochar carrier can be a static or shiftable.

In embodiments of the invention, the reactive gas is a mixture of multiple gases, at least one of which is a non-inert gas that strongly reacts with biochar.

In embodiments of the invention, the reactive gas contains carbon, leading to deposition of a carbon layer on the surface of the biochar.

In embodiments of the invention, the biochar is treated with different plasmas using different gases in sequence, or the biochar passes through one or multiple plasma regions in sequence. Each region is fed with the same or different gases.

In embodiments of the invention, the plasma is generated by inductively coupled discharge or capacitively coupled discharge in a suitable low-pressure gaseous environment. The RF power supply has a frequency ranging from about 10 kHz to about 300 GHz. The plasma excitation power source can be a combination of multiple power supplies supplying different frequencies, and a combination of alternative current (AC) and direct current (DC) sources, or a pulsed DC source.

In an embodiment, a method for activating biochar includes disposing biochar material in a vacuum chamber, introducing a reactive gas into the vacuum chamber at a pressure between 0.01 and 200 Torr, and generating plasma in the vacuum chamber with an external RF power supply such that the biochar material is in contact with the plasma for a time period from about 10 seconds to about 30 minutes to form activated biochar. The step of introducing a reactive gas into the vacuum chamber may include introducing oxygen, methane, silane, or a metallorganic gas.

In embodiments of the invention the step of generating plasma in the vacuum chamber with an external RF power supply may involve introducing power with a frequency of between 10 kHz and 300 GHz. In an embodiment, the frequency may be 13.56 MHz.

In embodiments of the invention, the step of introducing a reactive gas can involve introducing a mixture of gases. The mixture of gases can include an inert gas.

In embodiments of the invention, the biochar material can be disposed on a carrier, which may be electrically biased or set at a floating electrical potential.

In embodiments of the invention, the biochar material can be disposed on a conveyor.

In embodiments of the invention, a step of generating plasma can involve first generating plasma with a first reactive gas, and second generating plasma using a different, second reactive gas.

In further embodiments of the invention, a supercapacitor is made by a process including disposing biochar material in a vacuum chamber, introducing a reactive gas into the vacuum chamber at a pressure between 0.01 and 200 Torr, generating plasma in the vacuum chamber with an external RF power supply such that the biochar material is in contact with the plasma for a time period from about 10 seconds to about 30 minutes to form activated biochar, and forming a slurry including the activated biochar to form a material for use in an electrode of the supercapacitor. The step of forming the slurry can include mixing the activated biochar with a polymer, which may be polytetrafluoroethylene.

In embodiments of the invention, the slurry can be deposited on a nickel foam material. The activated biochar may have a specific capacitance of at least 170 F $g^{-1}$.

In a further embodiment, a supercapacitor includes a pair of electrodes separated by a separator, each of the pair of electrodes including activated biochar material having a specific capacitance of at least 170 F $g^{-1}$. The activated biochar material can be mixed with a polymer, which may be polytetrafluoroethylene. The electrodes may further include a substrate, which may be nickel foil or foam.

BRIEF DESCRIPTION OF THE DRAWINGS

The embodiments of the present invention may be more completely understood in consideration of the following detailed description of various embodiments in connection with the accompanying drawings, in which.

Figure 1:
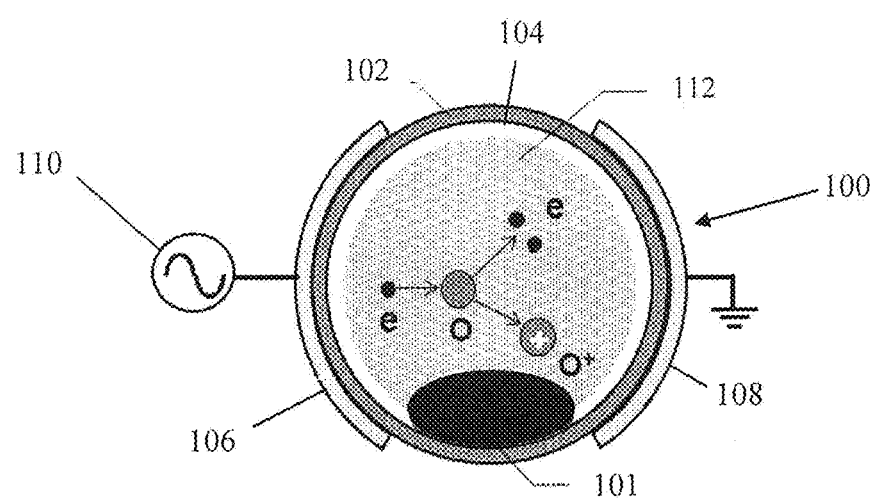
FIG. 1 is a schematic depiction of a plasma treatment apparatus in use.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION

Embodiments of the invention are generally directed to methods of activating biochar. These methods are superior to conventional thermochemical activation in terms of energy consumption, equipment simplicity, and process time. In general, the activation creates larger surface area and pore volume in biochar material. Furthermore, the activation may also modify the surface energy and/or wettability of the biochar. The activated biochar has many applications, such as water treatment, air purification, and energy storage. Examples are given hereinbelow to demonstrate the effectiveness of plasma activation of biochar.

Figure 13:
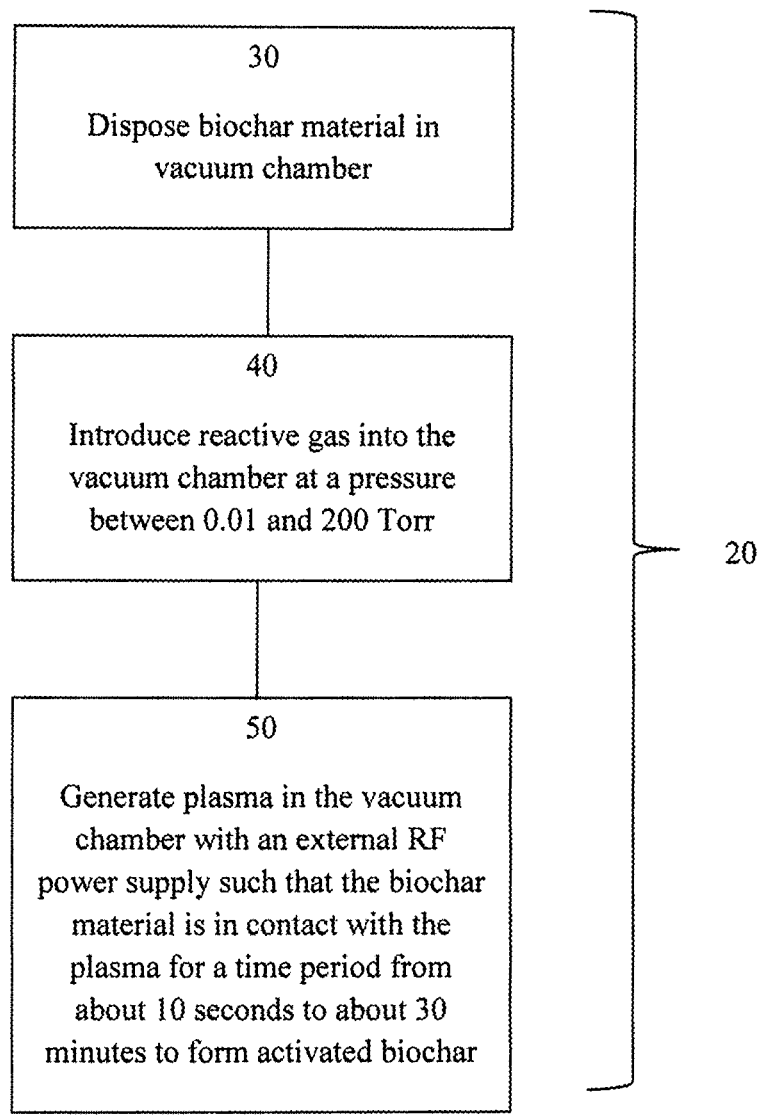
FIG. 13 is a flow chart of an exemplary process for plasma activation of biochar.

FIG. 13 generally depicts the plasma treatment process 20 in the form of a process flow diagram. At step 30, biochar material to be activated is disposed in a vacuum chamber. At step 40, reactive gas is introduced into the vacuum chamber at a pressure between 0.01 and 200 Torr. At step 50, plasma is generated in the vacuum chamber with an external RF power supply such that the biochar material is in contact with the plasma for a time period from about 10 seconds to about 30 minutes to form activated biochar.

In FIG. 1 there is depicted schematically an apparatus 100 for plasma activation of biochar 101. Apparatus 100 generally includes dielectric enclosure 102, which may be made from quartz, enclosing vacuum chamber 104, electrodes 106, 108, and RF power source 110. A reactive gas or mixture of gases at a pressure generally lower than atmospheric is introduced and contained in vacuum chamber 104. The gases may include, but are not limited to, oxygen, hydrogen, nitrogen, argon or other inert gases, or mixtures thereof, other gases or mixtures with a chemical composition including carbon, or silane or metalIorganic gases and/or mixtures thereof with other gases. The reactive gas can be supplied within a wide range of pressures, ranging from about 0.01 Torr to about 200 Torr. Discharge through the dielectric barrier defined by dielectric enclosure 102, excited by RF power from RF power source 110, creates plasma 112 for activating biochar 101 disposed within plasma 112. RF power supply 110 may supply energy within a wide range of RF excitation frequencies ranging from 10 kHz to 300 GHz, such as will enable generation of plasma 112. A typical RF excitation frequency used is 13.56 MHz. Other typical frequencies are 450 kHz, 2 MHz, 4 MHz, and 27.12 MHz. Moreover, as will be appreciated by those of skill in art, the RF power supply can supply energy at a single RF frequency, or multiple RF frequencies simultaneously or in series over time. Electron-gas interactions in plasma 112 include ionization, excitation, and elastic scattering. One example reaction between the electrons and gas is an electron colliding with an oxygen atom, creating an oxygen ion and two free electrons. These electron-gas interactions can generate many reactive species, for example excited oxygen atoms O* and oxygen ions $O^+$. It will be appreciated that plasma activation of biochar according to embodiments of the invention can include multiple steps in sequence—for example, the biochar may be first treated with plasma generated using oxygen gas as a significant component of the gas mixture in the chamber, and then treated with plasma using methane as a significant component of the gas mixture in the chamber. Generally, the time for effective activation of biochar 101 is between 10 seconds and 30 minutes, depending on the system and process parameters, and the physical characteristics of biochar 101. In general, no external heating is necessary, which makes plasma activation a room-temperature process. However, external heating may expedite the activation process or may be needed to create a specific microstructure. Moreover, higher RF power levels may generally result in shorter activation times.

Figure 2A:
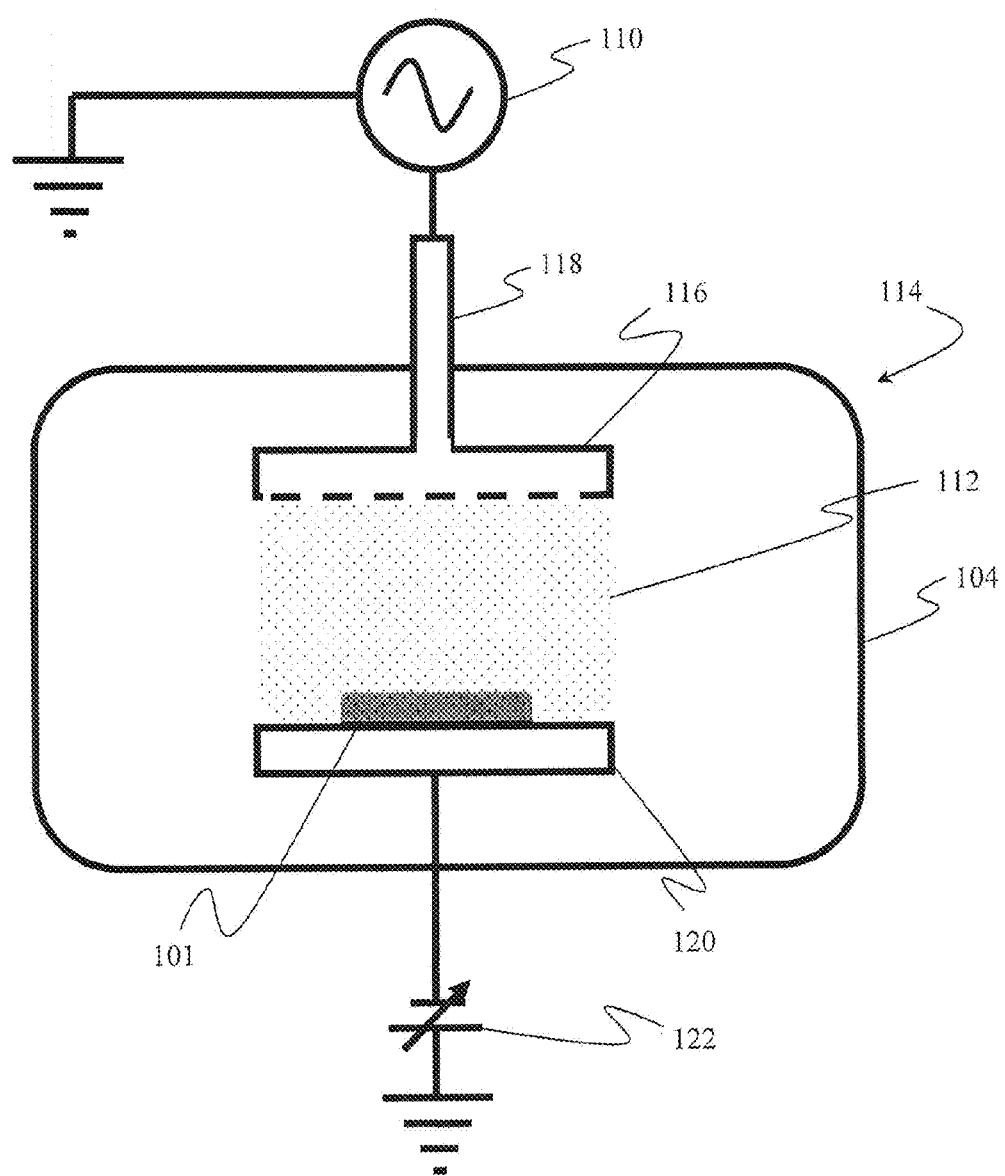
FIG. 2a is a schematic depiction of a capacitively coupled plasma treatment apparatus.
Figure 2B:
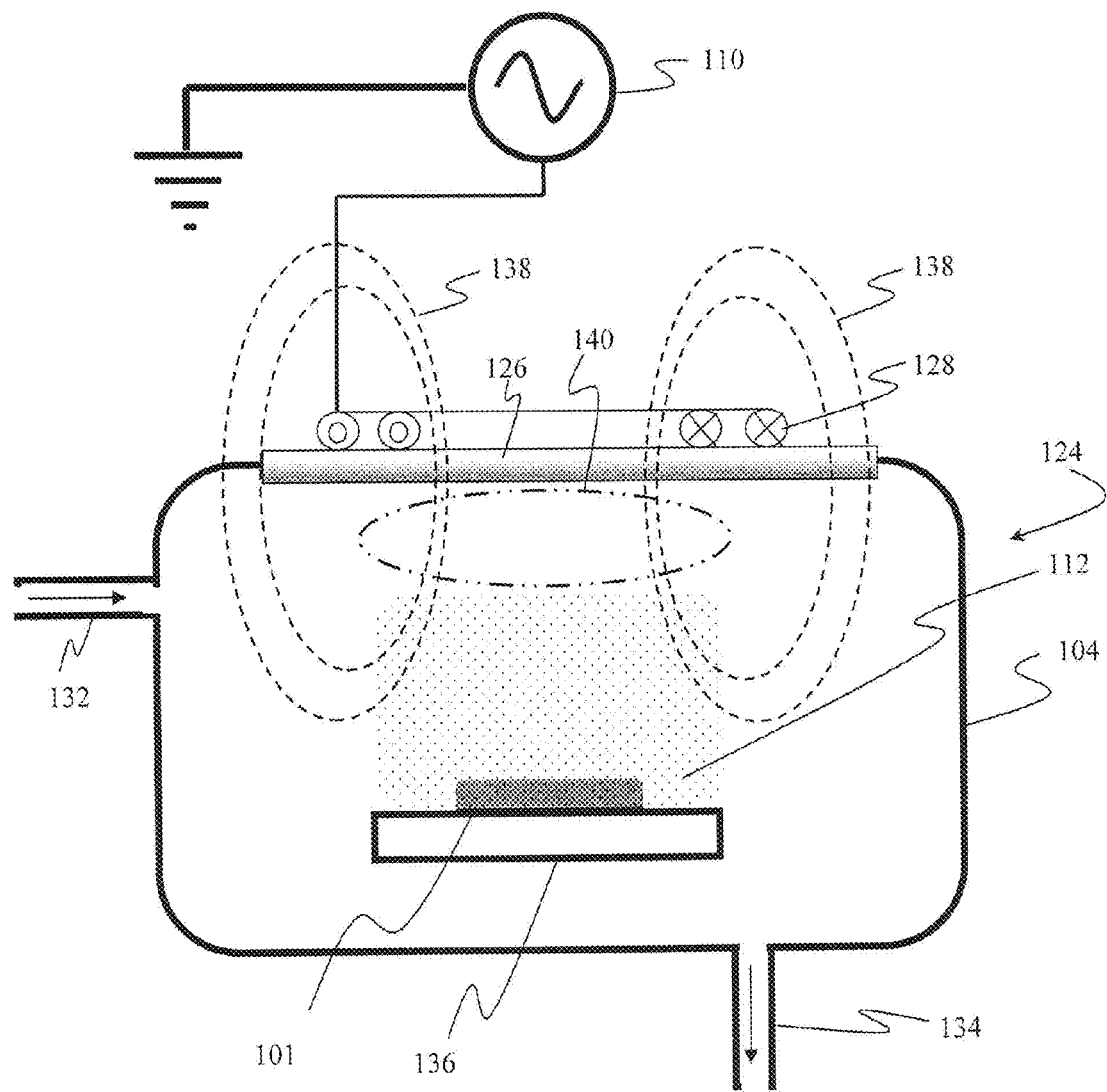
FIG. 2b is a schematic depiction of an inductively coupled plasma treatment apparatus.

FIGS. 2a and 2b schematically illustrate the principles of plasma treatment using capacitively coupled plasma excitation and inductively coupled plasma excitation. In FIG. 2a, capacitively coupled plasma treatment system 114 generally includes vacuum chamber 104 containing a low-pressure reactive gas or gas mixture with components as set forth above. Cathode 116 is electrically coupled to RF power supply 110. Gas feed-through component 118 conveys the reactive gas to chamber 104. Plasma 112 is generated between cathode 116 and anode 120. Anode 120 may be negatively biased through variable capacitance 122 or at a floating potential. Biochar 101 can be disposed directly on anode 120, or in a carrier (not depicted) electrically coupled with anode 120.

As depicted schematically in FIG. 2b, inductively coupled plasma treatment system 124 generally includes vacuum chamber 104 having dielectric window 126 which may be made from quartz, RF induction coil 128 electrically coupled with RF power source 110, and biochar carrier 136, which may be negatively electrically biased or at a floating potential. Gas inlet 132 and gas outlet 134, which may be coupled to a vacuum pump (not depicted), enable reactive gas to pass through chamber 104. Biochar 101 rests on biochar carrier 136. With the application of RF energy from RF power supply 110 to RF induction coil 128, induced electromagnetic fields 138 induce current 140 in the reactive gas, and generate plasma 112 for treatment of biochar 101.

Figure 3A:
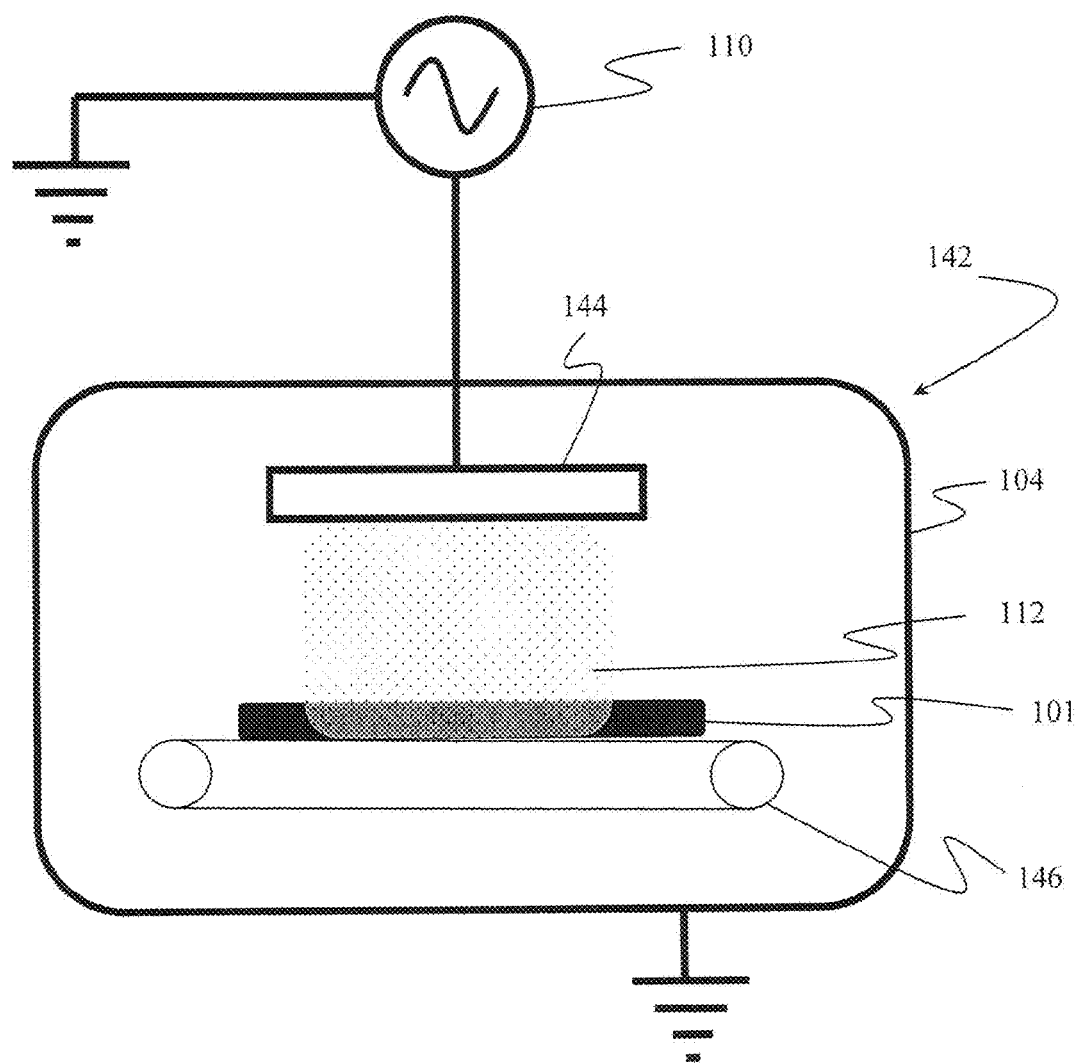
FIG. 3a is a schematic depiction of a plasma treatment system including a conveyor for continuous activation of biochar in large scale processing.
Figure 3B:
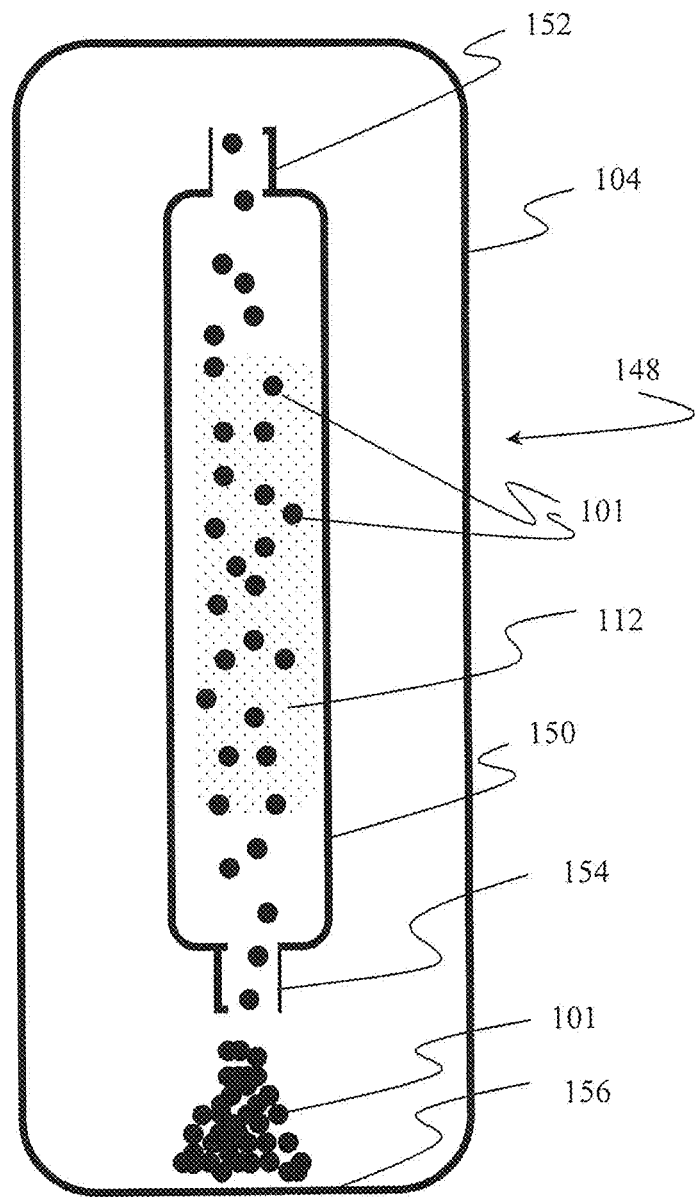
FIG. 3b is a schematic depiction of a plasma treatment system including a plasma confinement component for continuous activation of biochar in large scale processing.

In embodiments of the invention, plasma treatment of biochar 101 can be a continuous process so as to enable large scale processing. FIGS. 3a and 3b depict embodiments involving movement of biochar through plasma by mechanical conveyor and gravity, respectively.

FIG. 3a schematically depicts a plasma treatment system 142 having a mechanical conveyor. System 142 generally includes vacuum chamber 104 containing a low-pressure reactive gas or gas mixture, electrode 144 electrically coupled with RF power source 110, and mechanical conveyor 146. Vacuum chamber 104 is at ground potential. Application of RF power to electrode 144 using RF power source 110 creates plasma 112. Biochar 101 is transported through plasma 112 by conveyor 146. Conveyor 146 can be configured so that biochar 101 passes through plasma 112 more than once, as may be necessary in order to achieve optimal activation.

FIG. 3b schematically depicts a plasma treatment system having a gravity feed arrangement. Plasma treatment system 148 generally includes vacuum chamber 104, and plasma containment enclosure 150. Plasma 112 is generated within plasma containment enclosure 150 by capacitive or inductive coupling as described hereinabove. Biochar particles 101 are released from top end 152 of plasma containment enclosure 150, and fall through plasma 112 by gravity. Biochar particles 101 exit plasma containment enclosure 150 through bottom end 154, and accumulate on bottom surface 156 of vacuum chamber 104. From this point, biochar particles 101 can be returned to top end 152 for further treatment, or can be removed from vacuum chamber 104.

The effectiveness of plasma activation of biochar 101 can be evaluated by comparing it with standard chemical activation. A typical chemical activation process involves mixing NaOH and biochar at a 2:1 ratio, and then baking the mixture at 700-1200° C. for 1-6 hours in a nitrogen atmosphere. After cooling down to room temperature, the activated biochar is washed with 0.1 mol $L^{-1}$ HCl and deionized water to reach a pH of 7, and then dried at 105° C. for 12 hours.

Various techniques can be used to characterize the composition, structure, and porosity of biochar. A few typical tests are described here. Isotherm adsorption of $N_2$ at 77 K can be carried out using a Micromeritics® ASAP 2010 Micropore Analyzer. The specific surface area can be calculated using the Brunauer-Emmett-Teller (BET) equation. The pore size distribution can be determined using Barrett-Joyner-Halenda (BJH) analysis. The structure of biochar 101 may be characterized using Horiba Raman spectroscopy at room temperature, with an excitation wavelength of 532 nm from a diode-pumped solid-state laser. The surface morphology may be characterized using a Hitachi® S3400 scanning electron microscope (SEM) and a FEI Tecnai Spirit $G^2$ Twin transmission electron microscope (TEM). The elemental analysis can be completed using energy dispersive X-Ray spectroscopy (EDX) attached to the SEM system.

Figure 14:
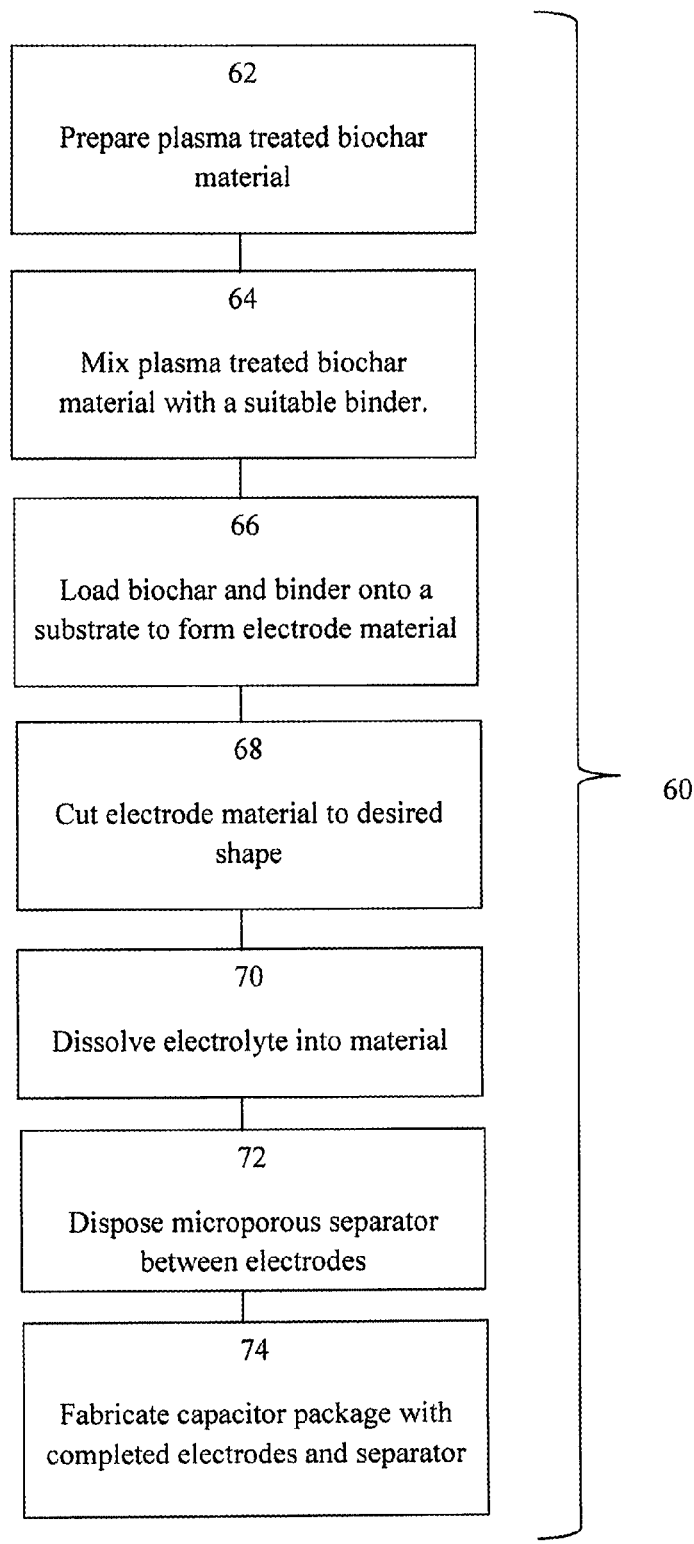
FIG. 14 is a flow chart of an exemplary process for fabricating a supercapacitor using plasma activated biochar.

In embodiments of the invention, the plasma activated biochar 101 can be used to fabricate supercapacitor devices. A supercapacitor device fabrication process is described next in exemplary fashion and depicted in the flow chart of FIG. 14. Supercapacitor fabrication process 60 begins with a first step 62 of preparing plasma treated biochar material as described elsewhere herein. Next, at step 64 the activated biochar is mixed with a suitable binder, which can be a polymer material, or any other material that will function as a binder and that has suitable electrical properties. In one embodiment, a slurry is prepared with the activated biochar 101 mixed with polytetrafluoroethylene (PTFE) as a binder in a mass ratio of 8.5:1.5 of biochar to PTFE. Next, at step 66, the biochar and binder is loaded onto a suitable substrate to prepare electrode material. The active electrode mass loaded on the nickel foil or foam can be about 15 mg per $cm^2$ consistency. It will be appreciated that other mass ratios, polymer materials, and loading densities can be used within the scope of the invention. The substrate can be a metallic foil or other material. In an embodiment, nickel foam (EQ-bcnf-80 um from MTI Corp.) was used as the substrate. Next, at step 68, the electrode material including the biochar material and the substrate can be cut into any desired shape so as to enable packaging into a capacitor device. The package can take the form of a CR2032 coin case cell as further described below, or can be packaged in surface mount, through-hole, lamination, or any other commonly known package. Next, at step 70, a suitable electrolyte can be dissolved into the electrodes. The electrolyte can be 6 mol $L^{-1}$ KOH, or other suitable composition. A microporous separator (e.g. 3501, Celgard) is then set between a pair of electrodes at step 72. Finally, the components are assembled into the capacitor package configuration at step 74.

Fabricated supercapacitors can be evaluated using a cyclic voltammetry (CV) system such as an Ametek® VersaSTAT-450 Potentiostat from Princeton Applied Research of Oak Ridge, Tenn. A typical scan rate is 20 $mVs^{-1}$, with a cyclic potential sweep set with an initial and final voltage of −1.0 V and a vertex voltage of 1.0 V. The impedance of fabricated supercapacitors can be measured using impedance spectroscopy, for example the VersaSTAT-450, with a frequency range of 0.1 Hz to 100 kHz and potential amplitude of 10 mV. Specific capacitance can be calculated from galvanostatic discharge characteristics and expressed in Farads per gram of active biochar deposited on the electrode. The calculation may be done according to the equation:

$$C = \frac{2I\Delta t}{m\Delta v}$$

where I is the charge or discharge current density, $\Delta t$ is the charge or discharge time, m is the electrode mass, and $\Delta v$ is the total change in voltage.

The present invention is further defined in the following Examples. It should be understood that these Examples, while indicating embodiments of the invention, are given by way of illustration only. From the above discussion and these Examples, one skilled in the art can ascertain characteristics of the invention, and without departing from the spirit and scope thereof, can make various changes and modifications of the invention to adapt it to various usages and conditions.

EXAMPLES

Example 1

Oxygen Plasma Activation of Biochar

Figure 4A:
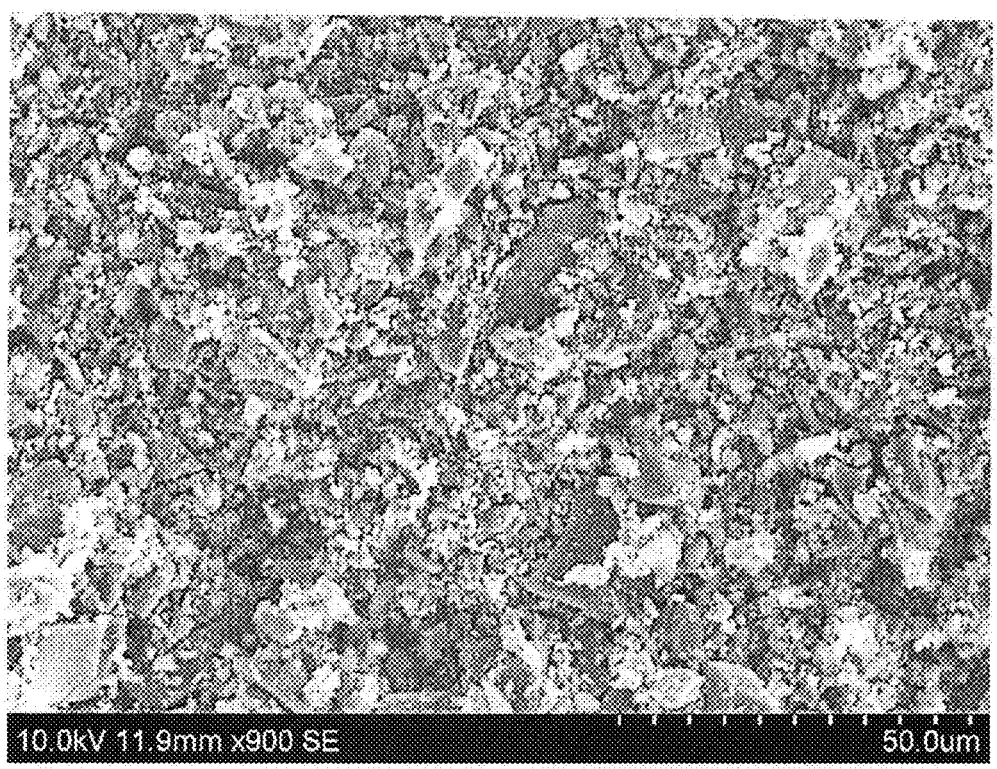
FIG. 4a is a scanning electron microscope image of untreated biochar.
Figure 4B:
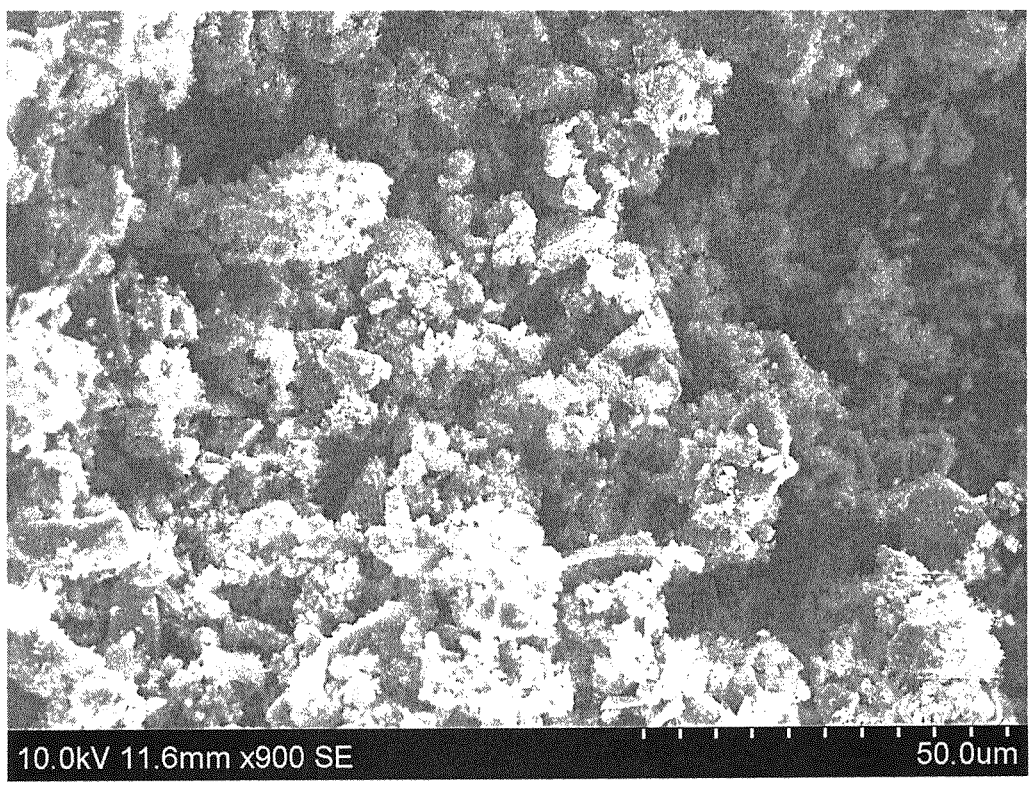
FIG. 4b is a scanning electron microscope image of plasma activated biochar.
Figure 4C:
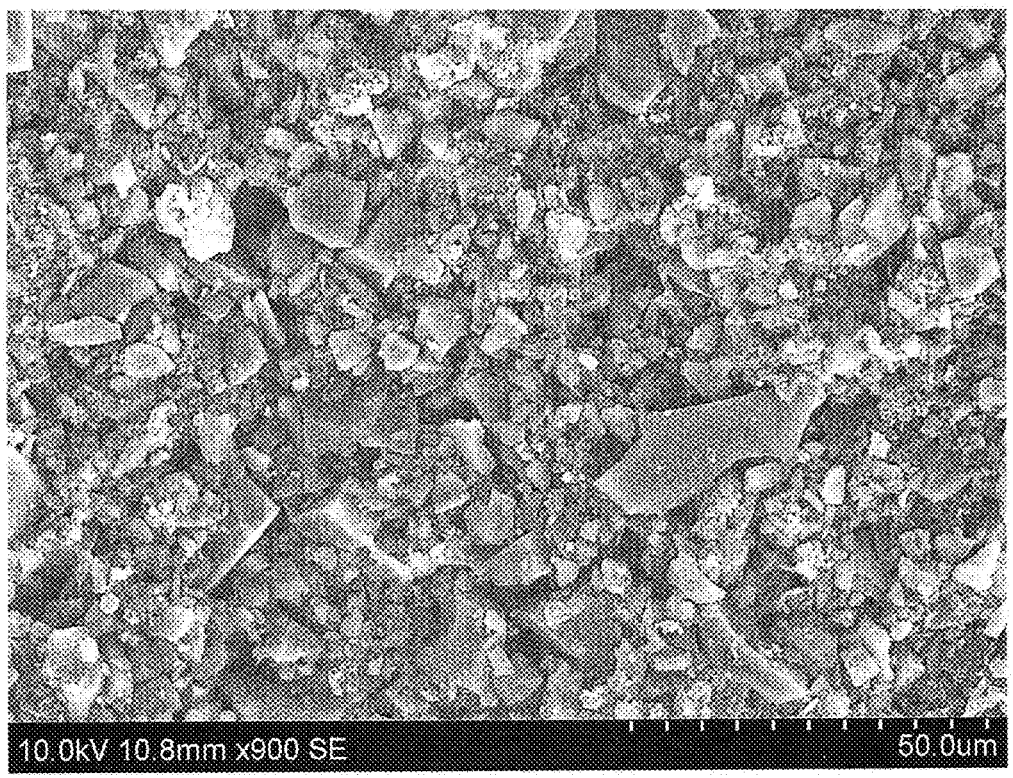
FIG. 4c is a scanning electron microscope image of chemically activated biochar.

FIGS. 4a through 4c show scanning electron microscope (SEM) images of untreated, oxygen plasma activated, and chemically activated yellow pine biochar respectively. The chemically activated sample of FIG. 4c was prepared by mixing NaOH and biochar at a 2:1 ratio, and then baking the mixture at 950° C. for 2 hrs in a nitrogen atmosphere. After cooling down to room temperature, the activated biochar was washed with 0.1 mol L$^{-1}$ HCl and deionized water to reach a pH of 7, and then dried at 105° C. for 12 hours.

The plasma activation was conducted for 5 minutes using oxygen gas within vacuum chamber 104 at a pressure of 2 Torr. Excitation power of 50 W was applied at a radio frequency (RF) of 13.56 MHz. No external heating was used.

As depicted in the SEM image of FIG. 4a, the untreated biochar 101 contained a mixture of small and large particles. After the plasma activation, as depicted in the SEM image of FIG. 4b, the biochar surface became porous, and fewer large-size particles remained visible. These results imply that the plasma selectively etched off certain phases in the biochar.

Contrary to the plasma activation result, however, chemical activation broke down large particles of the biochar 101 into smaller ones, and eliminated extremely fine particles, as depicted in the SEM image of FIG. 4c.

The oxygen plasma treatment was a rapid process, with the yield of biochar depending on the time used for plasma treatment. After 5 minutes of plasma activation at the 50 W RF excitation power, the biochar yield was about 90% by comparing the weight before and after the plasma treatment.

Table 1 summarizes the EDX results of the biochar 101 composition before and after activation with the plasma and chemical methods. For the untreated biochar, K$\alpha$ lines of carbon and oxygen were pronounced. Oxygen content increased after the plasma treatment, which greatly modified the biochar surface bonds.

TABLE 1

Elemental composition from EDX analysis of different biochar powders.

| | | Concentration (wt %) | | |
| --- | --- | --- | --- | --- |
| Element. | Line | Untreated | Plasma activated | Chemically activated |
| C | K$\alpha$ | 77.61 | 79.25 | 84.85 |
| O | K$\alpha$ | 9.86 | 15.69 | 12.86 |
| Mg | K$\alpha$ | 2.62 | 1.62 | 1.20 |
| Si | K$\alpha$ | 2.35 | 0.00 | 0.45 |
| Ca | K$\alpha$ | 7.56 | 3.44 | 0.64 |
| Total | | 100.00 | 100.00 | 100.00 |

Figure 5:
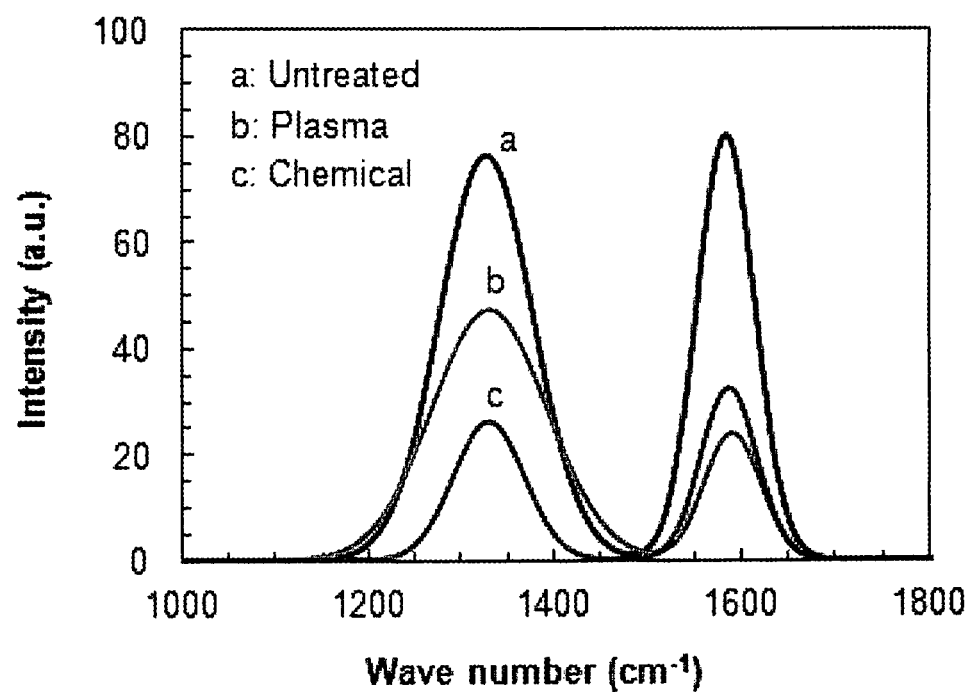
FIG. 5 depicts Raman spectra of untreated, plasma activated, and chemically activated biochar.

FIG. 5 shows the Raman spectra of untreated, plasma activated, and chemically activated biochar. The characteristic peak around 1530-1610 cm$^{-1}$ (G-band) corresponds to individual graphite dominated by sp$^2$ bonds, while the peak around 1320-1370 cm$^{-1}$ (D-band) indicates a disordered and imperfect structure. An increase in $I_D/I_G$ reflects a higher proportion of sp$^a$ carbon. For the chemically activated biochar, the ratio of $I_D/I_G$ decreased slightly from 0.95 (untreated biochar) to 0.82, indicating a weak selective chemical etching. For the plasma activated biochar, the $I_D/I_G$ ratio increased by more than two times compared to the untreated biochar. This result implied that the oxygen plasma etched sp$^2$ carbon faster than sp$^3$ carbon.

Figure 6A:
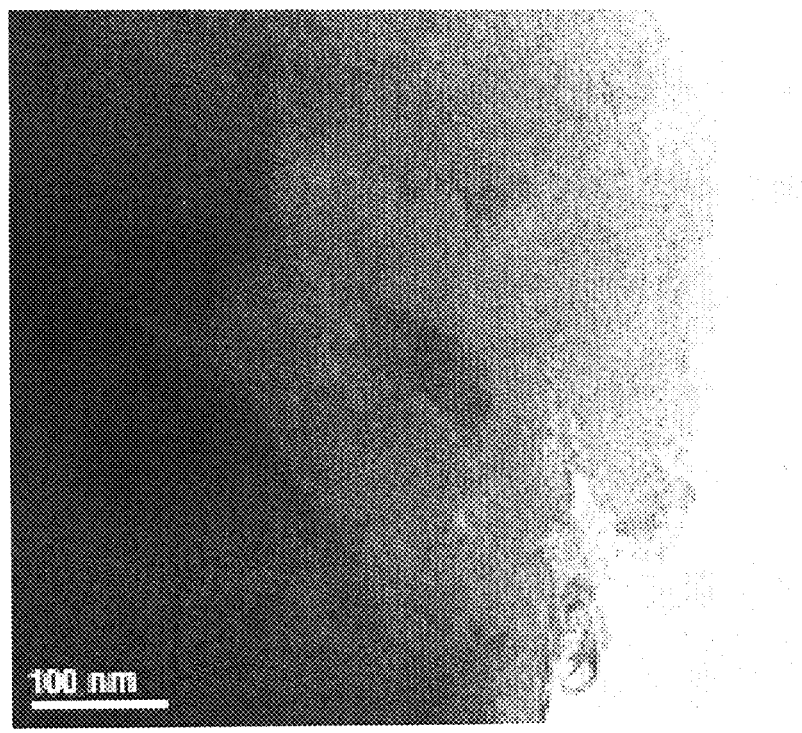
FIG. 6a is a transmission electron microscope image of untreated biochar.
Figure 6B:
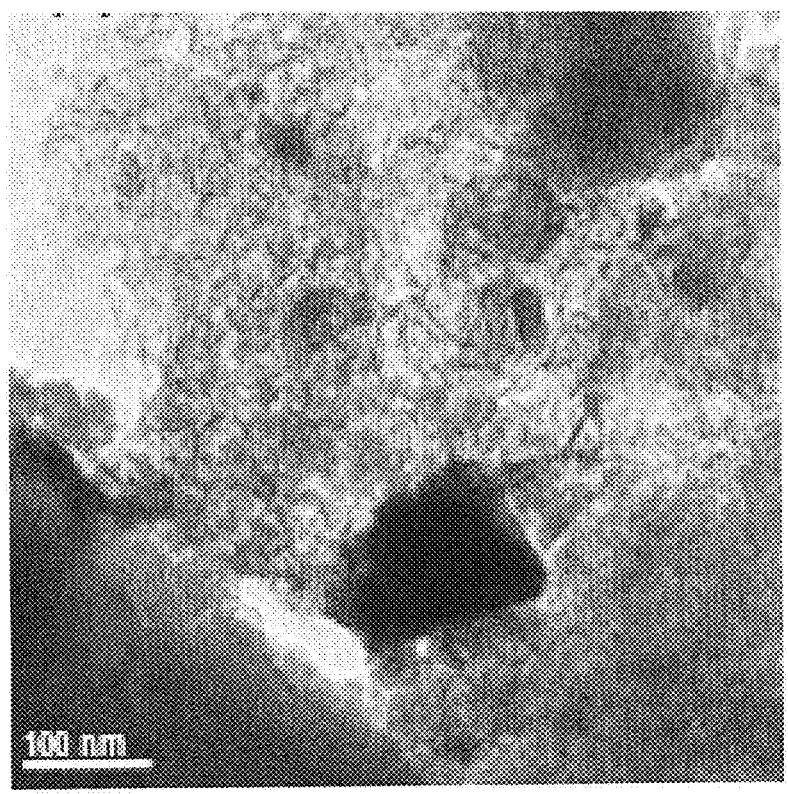
FIG. 6b is a transmission electron microscope image of plasma activated biochar.
Figure 6C:
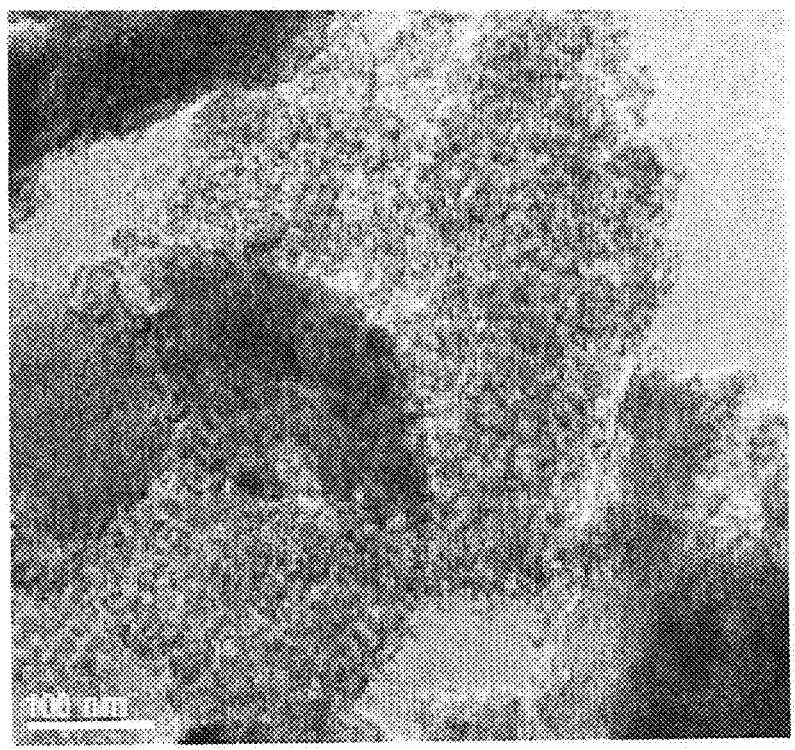
FIG. 6c is a transmission electron microscope image of chemically activated biochar.

As seen in the Transmission Electron Microscope (TEM) images of FIGS. 6a through 6c, the plasma activation resulted in the appearance of nano-fibers. The nano-fiber structure, as depicted in FIG. 6b, was consistently found all over the plasma treated biochar. The chemically activated biochar as depicted FIG. 6c, however, was found to have a microporous structure in which no nano-fibers were observed.

Figure 7:
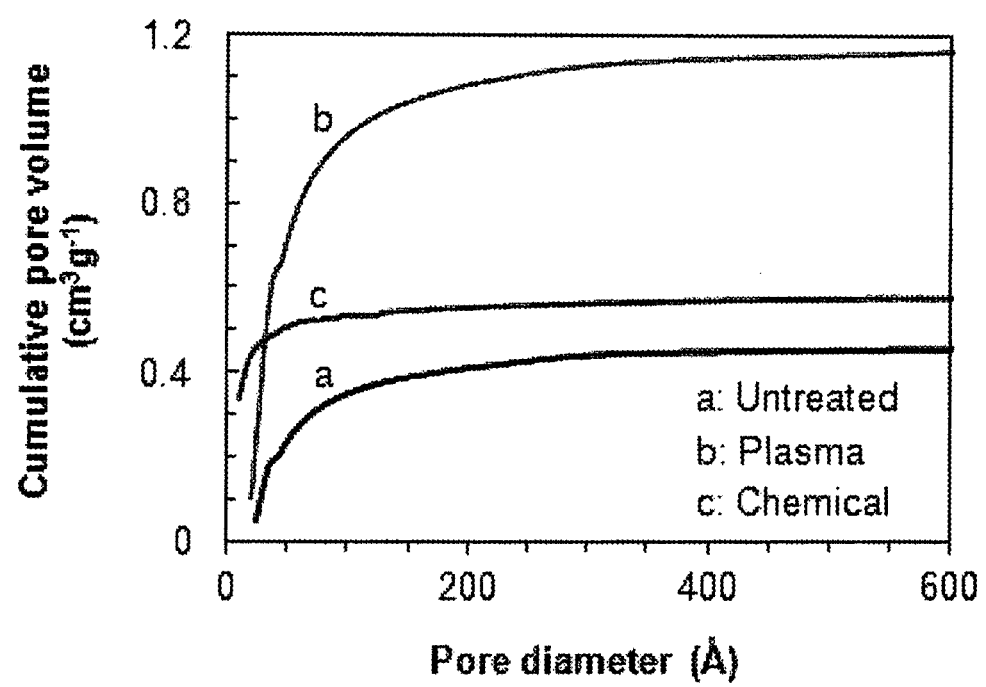
FIG. 7 depicts the cumulative pore volume vs. pore diameter for untreated, plasma activated, and chemically activated biochar.

Efficiently creating porous morphology in biochar is one of the desired effects of the activation. A large surface area combined with proper distribution of pore size (micropore, mesopore, and macropore) is the key to achieving high specific capacitance. Isotherm adsorption tests yielded varying cumulative pore volume vs. pore diameter figures for untreated, plasma activated, and chemically activated biochar, as shown in FIG. 7. The untreated biochar had fewer pores in the full test range of 0-600 Å pore size. As a result, it had the lowest cumulative pore volume. Chemical activation created uniform pores with relatively small sizes below 50 Å and the average pore size was 21.6 Å. Hence, it appears that chemical activation actually removes large pores that existed in the original biochar. Plasma activation creates various pores with sizes ranging from micropores (<20 Å) to macropores (>500 Å). The plasma activated biochar includes significantly more mesopores compared with chemically activated biochar. In other words, plasma activation created pores with wider distribution in pore size. This pore size distribution favors adsorption and/or ion transportation, leading to lower impedance and higher specific capacitance.

Example 2

Supercapacitors Using Oxygen Plasma Activated Biochar

Described below are examples of supercapacitors prepared using the treated and untreated biochar 101.

Figure 12:
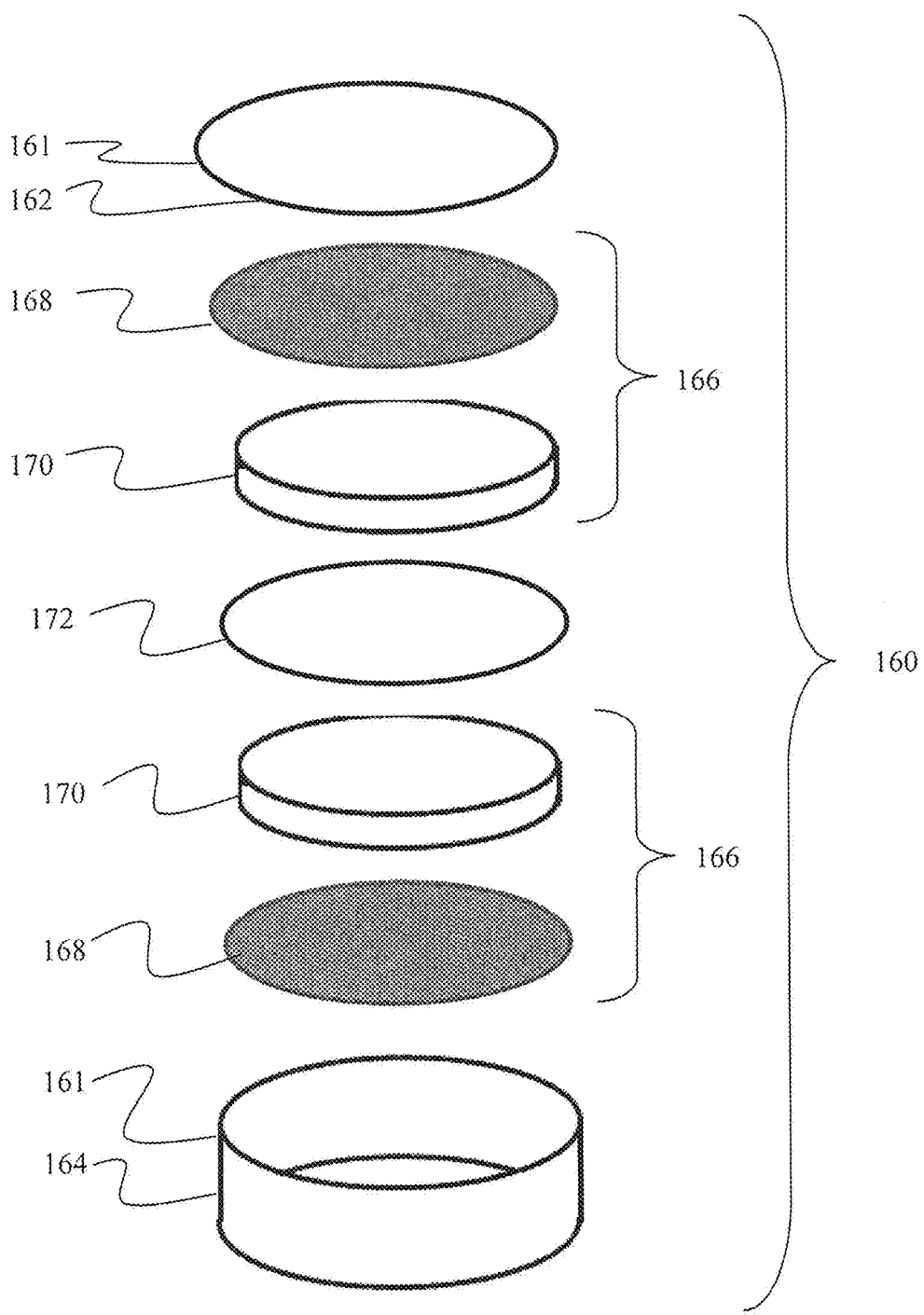
FIG. 12 depicts an exploded view of a supercapacitor.

As depicted in FIG. 12, supercapacitor 160 generally includes enclosure 161 which includes CR2032 coin case cell lid 162, CR2032 coin case cell base 164, electrodes 166 which generally include substrate 168 and biochar component 170, and separator 172. Substrates 168 were nickel foam (EQ-bcnf-80 um from MTI Corp.). Biochar components 170 were formed from slurry made from biochar 101. The biochar slurry was prepared using both treated and untreated biochar 101 mixed with polytetrafluoroethylene (PTFE) polymer in a mass ratio of 8.5:1.5 for biochar and PTFE respectively. To form electrodes 166, the biochar slurry was pressed onto the nickel foam substrate 168. Electrodes 166 were cut from the biochar coated nickel foam into a circular shape with a diameter of 1 cm. The biochar component 170 mass loaded on the nickel foam can be about 15 mg per cm$^2$ consistency. An electrolyte of 6 mol L$^{-1}$ KOH was dissolved into biochar components 170. Separator 172 made from microporous material (3501, Celgard) was set between electrodes 166. Electrodes 166 and separator 172 were then sealed in the CR2032 coin cell enclosure 161 at room temperature.

Figure 8:
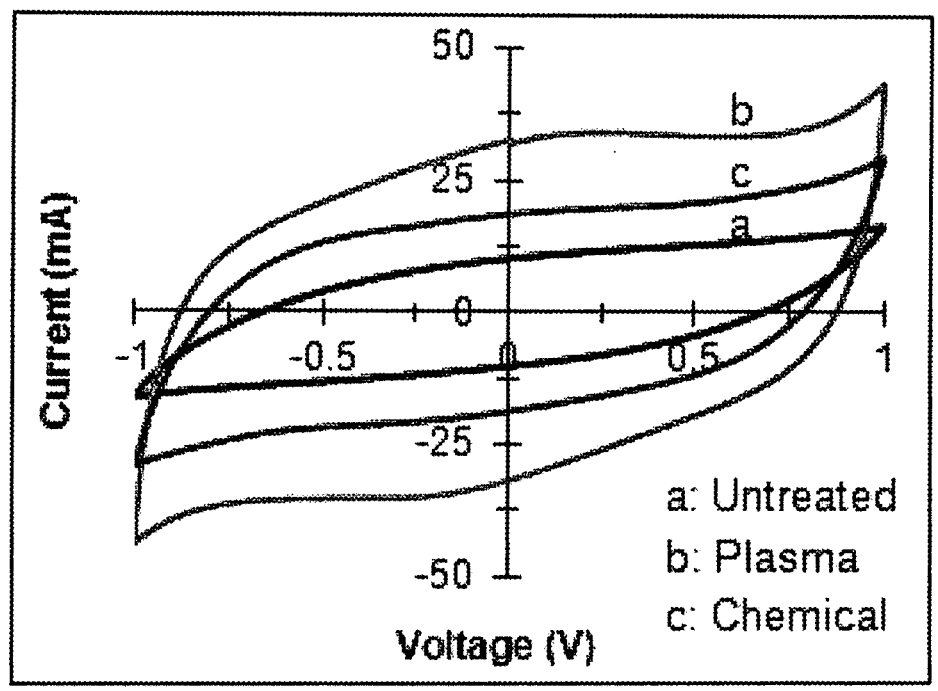
FIG. 8 depicts cyclic voltammetry (CV) curves of supercapacitors fabricated using untreated, oxygen plasma activated, and chemically activated biochar.

FIG. 8 shows measured cyclic voltammetry (CV) curves of supercapacitors 160 fabricated according to the above procedure using untreated, oxygen plasma activated, and chemically activated biochar 101. The specific capacitance was calculated to be 60.4 F g$^{-1}$, 171.4 F g$^{-1}$, and 99.5 F g$^{-1}$ for the untreated, plasma activated, and chemically activated biochar supercapacitors 160, respectively. The specific capacitance of 171.4 F g$^{-1}$ was the highest capacitance achieved for supercapacitors 160 made from plasma activated yellow pine biochar. The CV curve of the untreated biochar appeared elliptical, while the CV curves of plasma and chemically activated biochar appeared more rectangular that were the characteristics of an ideal electric double layer capacitor. Therefore, the plasma activation processes not only created a large surface area and pore volume, but also promoted surface energy and chemical structures that favored ion transport, forming the double layer. Note that in the CV measurements, the polarity was inverted to confirm the symmetry of the I-V characteristics.

Figure 9:
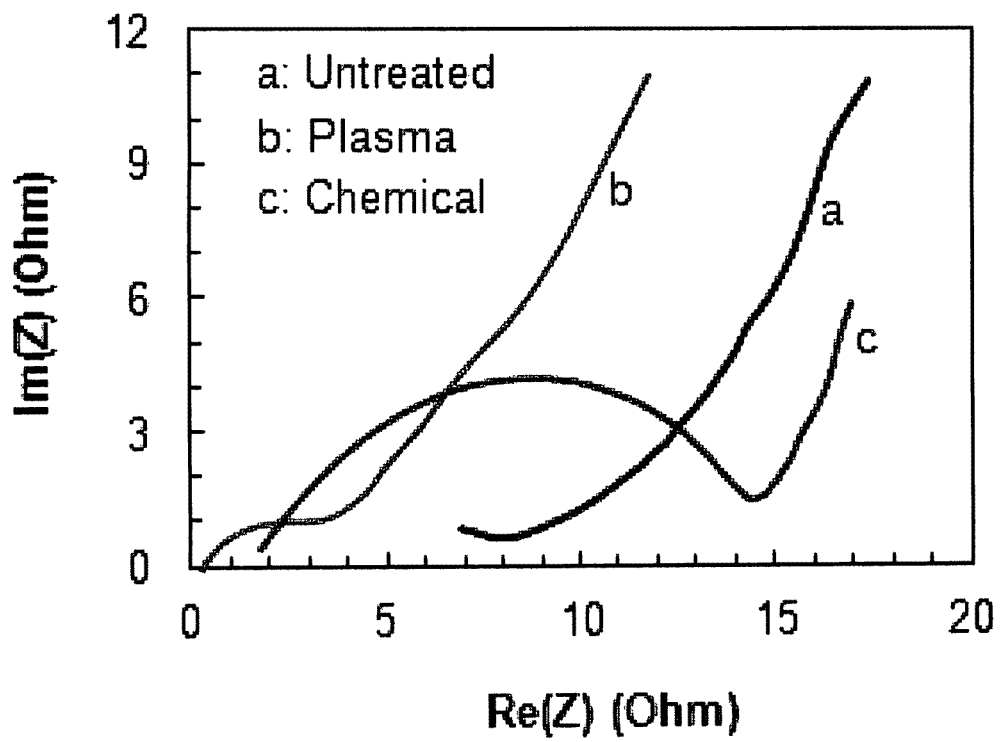
FIG. 9 depicts electrochemical impedance spectroscopy (EIS) curves of untreated, oxygen plasma activated, and chemically activated biochar supercapacitors over a measurement frequency range of 0.1 to 10 kHz.

FIG. 9 shows electrochemical impedance spectroscopy (EIS) plots of untreated, plasma activated, and chemically activated biochar supercapacitors 160. The measurement frequency ranged from 0.1 Hz to 10 kHz, and the voltage was 10 mV. The estimated resistance values, Re(Z), of the oxygen plasma activated, chemically activated, and untreated biochar supercapacitors 160 were 3.3 Ω, 14.5Ω, and 8.2Ω respectively. The low resistance resulting from the plasma activation can be, to a great extent, attributed to ions having easy access to micropores and mesopores, as discussed above. It was also noted that chemical activation led to increased resistance. It should be noted that the EIS-measured impedance included contributions from both the biochar-based electrodes and the electrolyte. The supercapacitor fabrication process was kept constant; only the biochar activation was different. Therefore, the measured Re(Z) values reflected the effects of the different biochar activation methods on the material properties and morphologies.

Figure 10:
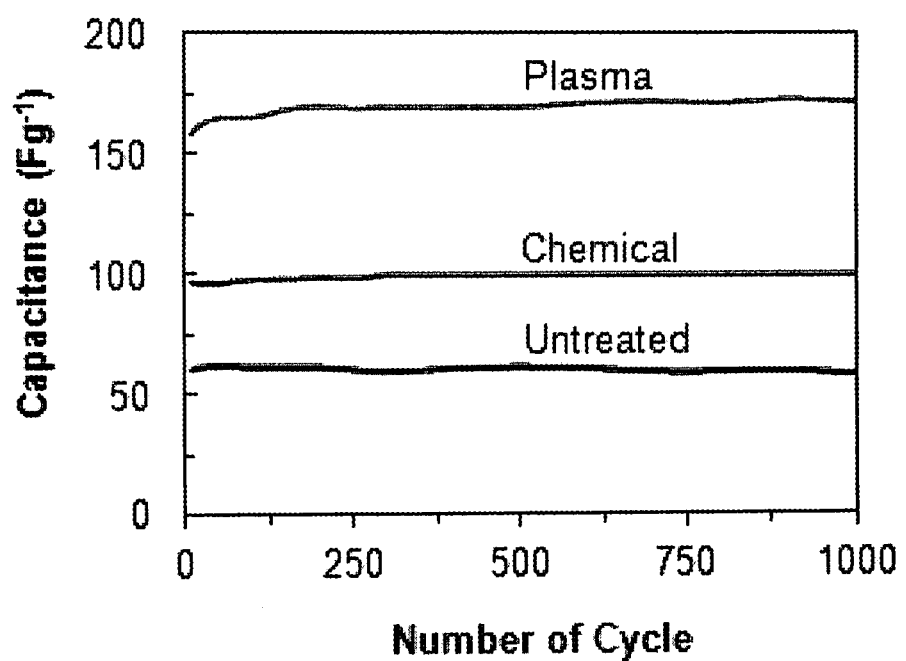
FIG. 10 illustrates specific capacitance vs. number of charge/discharge cycles for untreated, oxygen plasma activated, and chemically activated biochar supercapacitors.

FIG. 10 shows the specific capacitance vs. number of charge/discharge cycles for untreated, oxygen plasma activated, and chemically activated biochar supercapacitors 160. The current density was 160 mA g$^{-1}$. Notably, the specific capacitance did not change even after 1000 cycles.

Figure 11:
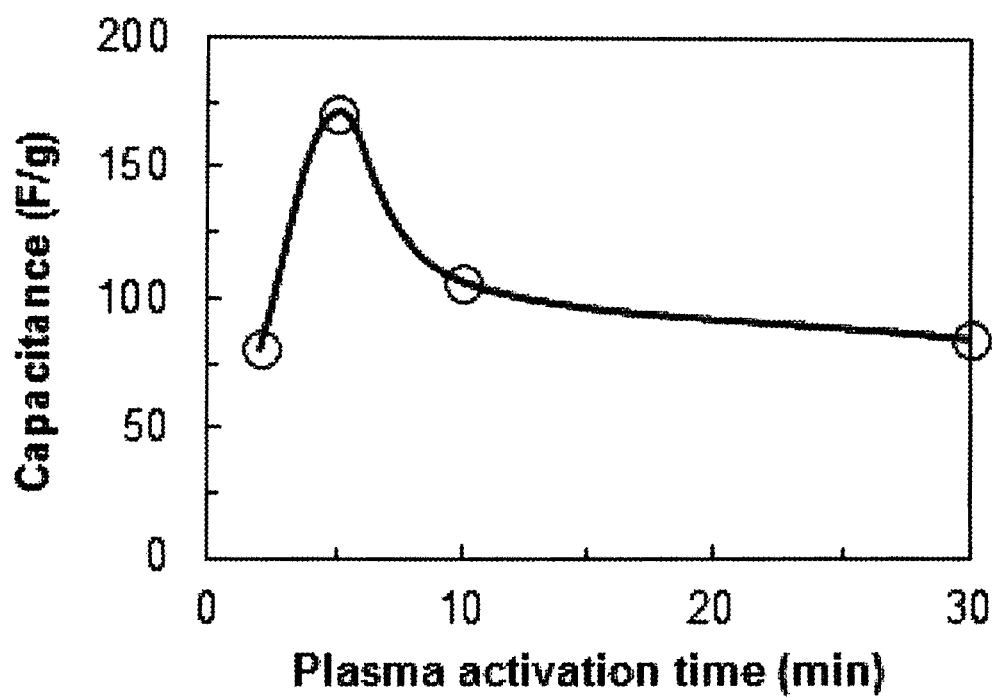
FIG. 11 depicts the effects of plasma treatment time on the specific capacitance of the biochar supercapacitors.

Oxygen plasma activation of yellow pine biochar was also performed with different process times: 2, 5, 10, and 30 minutes. Specific capacitance in the measured samples was highest following a 5 minute treatment, as illustrated in FIG. 11. This result indicated that very short plasma activation did not create enough porous morphology, while very long treatments could lead to deep but small pores and the removal of large surface pores. Notably, the 5-minute plasma activation is not necessarily the optimal time period for treatment, but appears to be more favorable than 2 or 10-30 minutes under the conditions used for the evaluation. Those of skill in the art will appreciate that optimal plasma activation time will depend on excitation power level and frequency, gas pressure, gas composition, biochar particle size, and/or temperature.

Example 3

Methane Plasma Activation of Biochar

Commercially activated biochar YP-50F (Kuraray Chemicals) was used in this example. YP-50F was synthesized from coconut and originally activated using steam at high temperatures. The YP-50F was then plasma treated to further improve performance.

The plasma activation of YP-50F was conducted using methane ($CH_4$) gas mixed with argon (Ar) at a volumetric ratio of 10% methane. The gas pressure was about 10 Torr. The RF power was 50 W, at a frequency of 13.56 MHz. The activation was performed for 5 minutes without external heating. For comparison, oxygen plasma activation was also performed under the same process conditions.

Table 2 below shows the BET surface area of YP-50F before and after the plasma treatment, as well as the specific capacitance and impedance of supercapacitors 160 made of the treated and as-received YP-50F. Methane plasma treatment appeared perform better than oxygen plasma treatment for YP-50F because it led to significantly lower impedance.

TABLE 2

Summary of BET surface area, CV measurement and impedance measurement results of untreated, oxygen and methane plasma treated YP-50F biochar.

| YP-50 biochar | BET surface area (m$^2$/g) | Specific capacitance (F g$^{-1}$) | Impedance (Ω) |
|---|---|---|---|
| Untreated | 1612 | 135.6 | 0.65 |
| Oxygen plasma treated | 1675 | 149.0 | 2.37 |
| Methane plasma treated | 1701 | 149.4 | 1.22 |

The above descriptions of the preferred embodiments and examples of the present invention are intended to be illustrative and are not intended to be limiting upon the scope and content of the following claims.

All of the methods and materials disclosed and claimed herein can be made and executed without undue experimentation in light of the present disclosure. While the methods and materials of this invention have been described in terms of the foregoing illustrative embodiments and examples, it will be apparent to those skilled in the art that variations, changes, modifications, and alterations may be applied to the materials and/or methods described herein, without departing from the concept, spirit, and scope of the invention. More specifically, it will be apparent that certain materials (like the process gas) that are chemically and/or electrically related may be substituted for the materials described herein while the same or similar results would be achieved. In some cases, components as are known to those of ordinary skill in the art have not been described in detail herein in order to avoid unnecessarily obscuring the present invention. All such similar substitutes and modifications apparent to those skilled in the art are deemed to be within the spirit, scope, and concept of the invention as defined by the appended claims.

For purposes of interpreting the claims for the present invention, it is expressly intended that the provisions of 35 U.S.C. §112(f) are not to be invoked unless the specific terms "means for" or "step for" are recited in a claim.

What is claimed is:

1. A method for activating biochar, the method comprising:
    disposing biochar material in a vacuum chamber;
    introducing a reactive gas comprising methane into the vacuum chamber at a pressure between 0.01 and 200 Torr; and
    generating plasma in the vacuum chamber with an external RF power supply such that the biochar material is in contact with the plasma for a time period from about 10 seconds to about 30 minutes to form activated biochar.

2. The method of claim 1, wherein the step of introducing a reactive gas into the vacuum chamber includes introducing oxygen.

3. The method of claim 1, wherein the step of introducing a reactive gas into the vacuum chamber includes introducing methane mixed with argon.

4. The method of claim 1, wherein the step of introducing a reactive gas into the vacuum chamber includes introducing silane.

5. The method of claim 1, wherein the step of introducing a reactive gas into the vacuum chamber includes introducing a metallorganic gas.

6. The method of claim 1, wherein the step of generating plasma in the vacuum chamber with an external RF power supply involves introducing power with a frequency of between 10 kHz and 300 GHz.

7. The method of claim 6, wherein the step of generating plasma in the vacuum chamber with an external RF power supply involves introducing power with a frequency of 13.56 MHz.

8. The method of claim 1, wherein the step of introducing a reactive gas involves introducing a mixture of gases.

9. The method of claim 8, wherein the mixture of gases includes an inert gas.

10. The method of claim 1, further comprising disposing the biochar material on a carrier.

11. The method of claim 10, further comprising electrically biasing the carrier.

12. The method of claim 10, further comprising setting the carrier at a floating electrical potential.

13. The method of claim 1, further comprising disposing the biochar material on a conveyor.

14. The method of claim 1, wherein the step of generating plasma involves first generating plasma with a first reactive gas, and second generating plasma using a different, second reactive gas.

* * * * *